(12) United States Patent
Fukuya et al.

(10) Patent No.: US 10,534,976 B2
(45) Date of Patent: Jan. 14, 2020

(54) DISPLAY APPARATUS, DISPLAY METHOD, AND NON- TRANSITORY STORAGE MEDIUM STORING DISPLAY PROGRAM

(71) Applicant: OLYMPUS CORPORATION, Hachioji-shi, Tokyo (JP)

(72) Inventors: Yoshiyuki Fukuya, Sagamihara (JP); Kazuo Kanda, Higashiyamato (JP); Kazuhiko Shimura, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 51 days.

(21) Appl. No.: 15/006,152

(22) Filed: Jan. 26, 2016

(65) Prior Publication Data

US 2016/0217342 A1 Jul. 28, 2016

(30) Foreign Application Priority Data

Jan. 28, 2015 (JP) .................................. 2015-014146

(51) Int. Cl.
*G06K 9/62* (2006.01)
*G06K 9/46* (2006.01)
*G06K 9/20* (2006.01)

(52) U.S. Cl.
CPC ............. *G06K 9/6202* (2013.01); *G06K 9/20* (2013.01); *G06K 9/46* (2013.01)

(58) Field of Classification Search
None
See application file for complete search history.

(56) References Cited

U.S. PATENT DOCUMENTS

| 8,566,192 | B2* | 10/2013 | De Mes | G06F 17/30265 |
| | | | | 705/35 |
| 8,866,908 | B2* | 10/2014 | Chishima | H04B 7/26 |
| | | | | 348/143 |
| 8,874,474 | B2* | 10/2014 | Wakai | H04N 21/6371 |
| | | | | 705/26.1 |
| 8,964,051 | B2* | 2/2015 | Toriumi | H04N 5/23293 |
| | | | | 348/207.1 |

(Continued)

FOREIGN PATENT DOCUMENTS

| CN | 1500251 A | 5/2004 |
| CN | 102902959 A | 1/2013 |
| JP | 2011-211388 A | 10/2011 |

OTHER PUBLICATIONS

English translation JP 2008236603 machine translation ;Nitta Takashi; Usui junichi et al. Mar. 23, 2007.*

(Continued)

*Primary Examiner* — Nancy Bitar
(74) *Attorney, Agent, or Firm* — Volpe and Koenig, P.C.

(57) ABSTRACT

A display apparatus includes a request information acquiring section, an information analyzing section, and a distinction tip deciding section. The request information acquiring section acquires request information including information to distinguish a target. The information analyzing section analyzes the request information acquired by the request information acquiring section, and extracts information required to distinguish the target. The distinction tip deciding section decides a distinction tip when a user distinguishes the target based on the information extracted by the information analyzing section.

10 Claims, 13 Drawing Sheets

(56) References Cited

U.S. PATENT DOCUMENTS

| | | | |
|---|---|---|---|
| 9,053,546 B2* | 6/2015 | Yoshii | G06T 7/0044 |
| 9,398,208 B2* | 7/2016 | Kiura | H04N 5/232 |
| 9,866,881 B2* | 1/2018 | Brav | H04N 5/23206 |
| 9,985,965 B2* | 5/2018 | Du | G06F 21/31 |
| 2001/0036520 A1* | 11/2001 | Hall | B32B 5/18 |
| | | | 428/35.5 |
| 2004/0054609 A1* | 3/2004 | Takahashi | G06Q 10/06 |
| | | | 705/35 |
| 2005/0171864 A1* | 8/2005 | Nakade | G06Q 30/0241 |
| | | | 705/14.4 |
| 2008/0025577 A1* | 1/2008 | Kugo | G06K 9/00234 |
| | | | 382/118 |
| 2008/0217831 A1* | 9/2008 | Siegel | B25B 1/2421 |
| | | | 269/266 |
| 2009/0247895 A1* | 10/2009 | Morikawa | A61B 5/04842 |
| | | | 600/544 |
| 2011/0103652 A1* | 5/2011 | Saruta | G06K 9/4671 |
| | | | 382/106 |
| 2016/0227096 A1* | 8/2016 | Brav | H04N 5/23206 |
| 2018/0248870 A1* | 8/2018 | Du | G06F 21/31 |

OTHER PUBLICATIONS

Office Action issued in corresponding Chinese Patent Application No. 201610046873.5 dated May 2, 2018, consisting of 20 pp. (English Translation Provided).

Office Action issued in corresponding Chinese Patent Application No. 201610046873.5 dated Jan. 9, 2019, consisting of 25 pp. (English Translation Provided).

* cited by examiner

| Distinction tip | Information |
|---|---|
| Hair | Color/shape |
| Clothes (upper) | Color/shape |
| Clothes (lower) | Color/shape |
| Shoe | Color/shape |
| Gender | Male/female |
| Height | Absolute value/relative value |
| School year/class | Oth year/class △ |

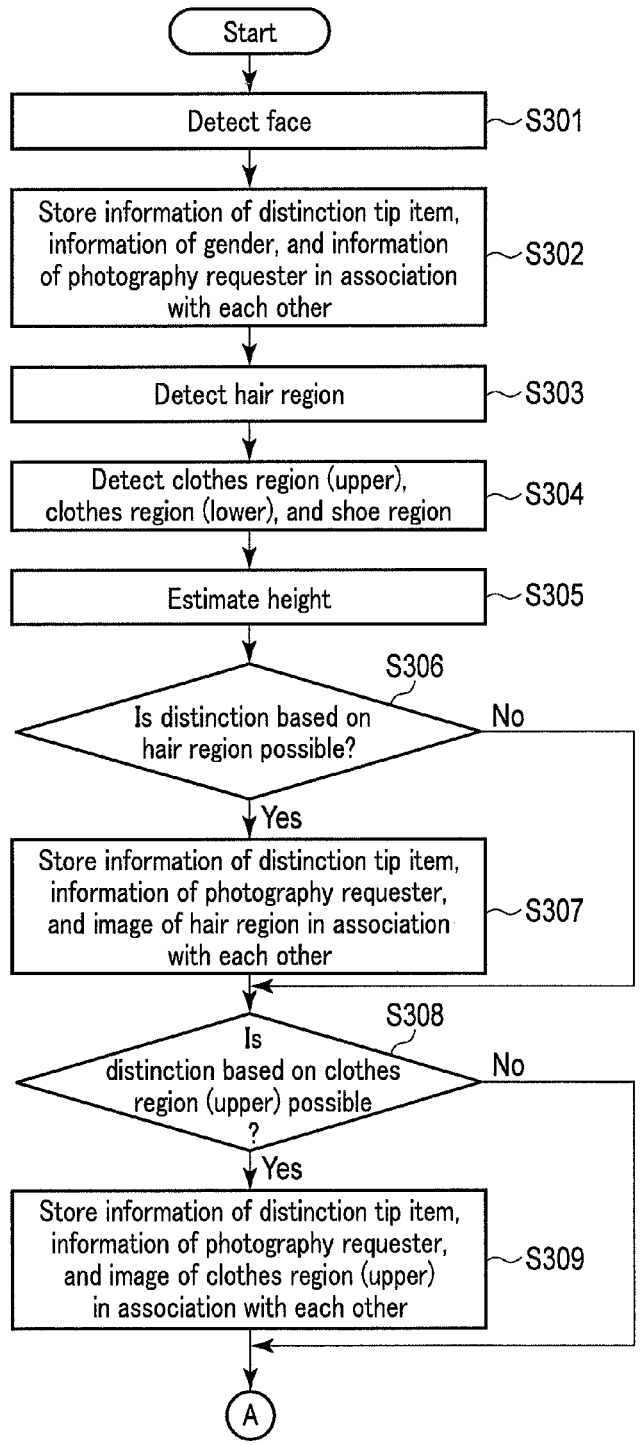
F I G. 7A

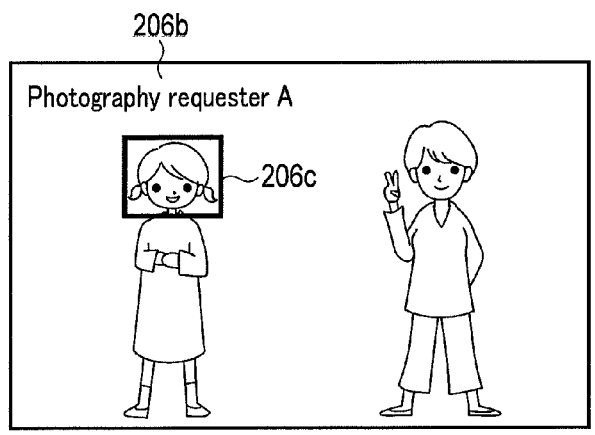
F I G. 10
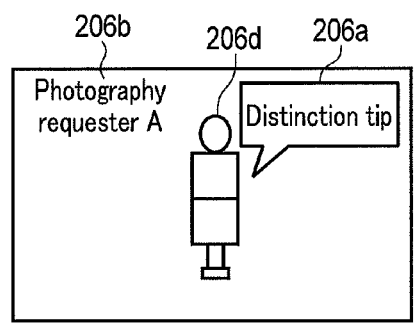
F I G. 11

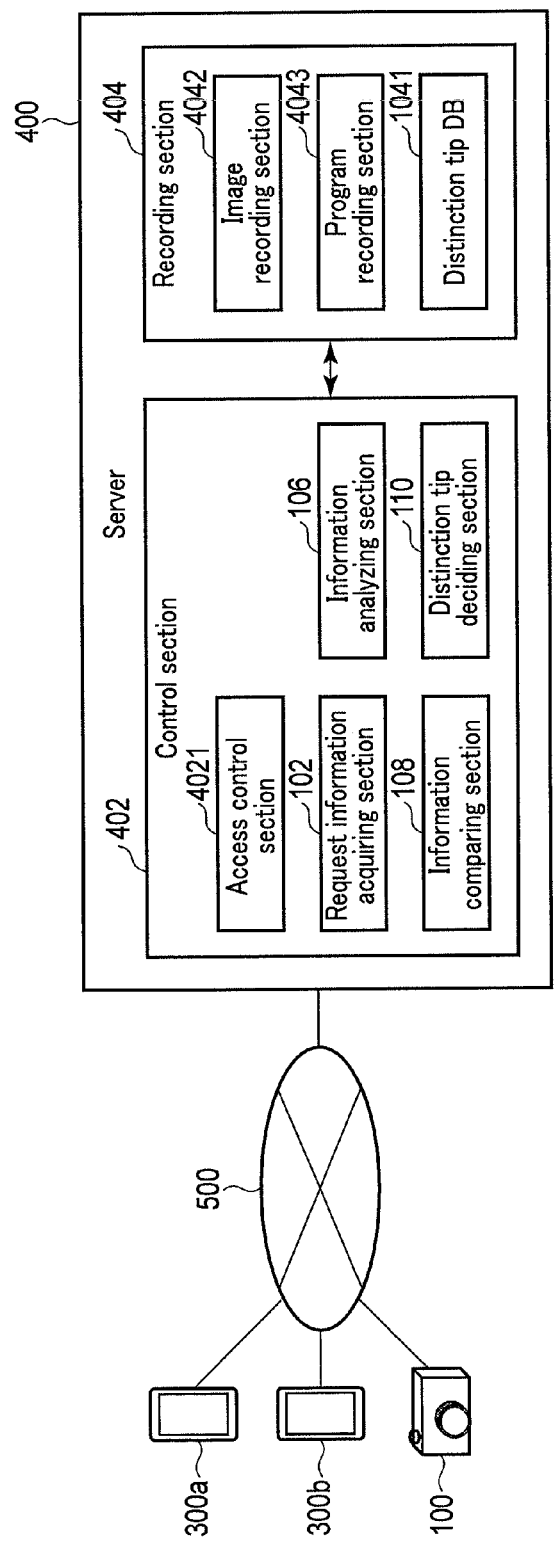
F I G 12

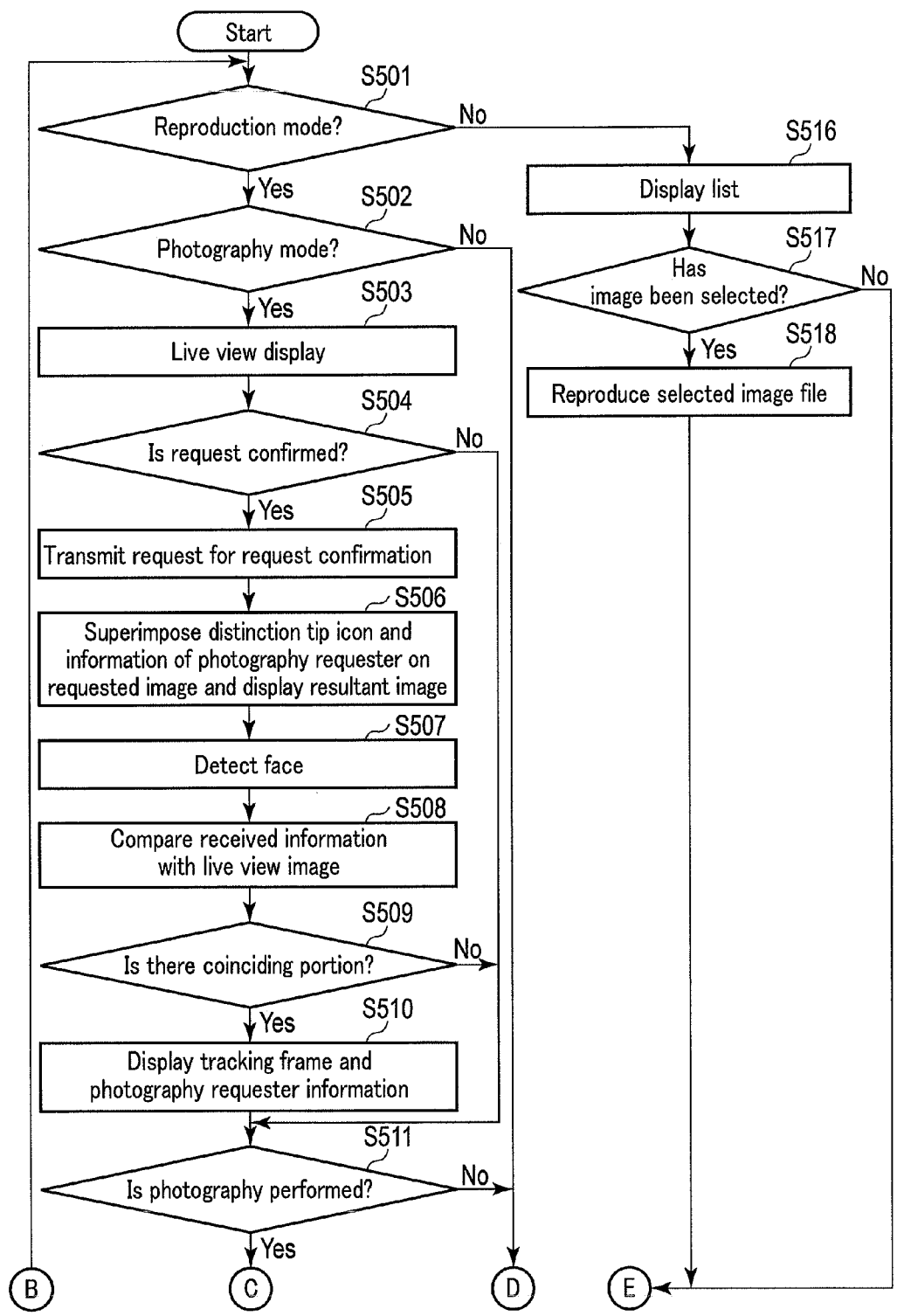
F I G. 14A ns of the invention, and together with the general description given above and the detailed description of the embodiments given below, serve to explain the principles of the invention.

FIG. 1 is a block diagram showing a conceptual configuration of an imaging apparatus according to an embodiment of the present invention;

FIG. 2 is a view showing an example of a distinction tip DB;

FIG. 3 is a block diagram showing a detailed configuration of the imaging apparatus in FIG. 1;

FIG. 4A and FIG. 4B are views for explaining an outline of an operation of the imaging apparatus according to an embodiment of the present invention;

FIG. 5 is a flowchart showing main processing of the imaging apparatus;

FIG. 6 is a flowchart showing distinction tip decision processing;

FIG. 7A is a first view of a flowchart showing determination processing;

FIG. 7B is a second view of the flowchart showing the determination processing;

FIG. 8 is a view for explaining a comparison between a requested image and a six-head figure model image;

FIG. 9 is a view showing a display example of a distinction tip icon when multiple pieces of photography request information are accepted;

FIG. 10 is a view showing a display example of a tracking frame on a subject in a live view image;

FIG. 11 is a view showing an example of displaying the distinction tip icon to an avatar image as Modification 1;

FIG. 12 is a view showing a configuration of a communication system as Modification 2;

FIG. 13 is a flowchart showing processing of a server in Modification 2;

FIG. 14A is a first view of a flowchart showing processing of an imaging apparatus in Modification 2; and FIG. 14B is a second view of the flowchart showing the processing of the imaging apparatus in Modification 2.

DISPLAY APPARATUS, DISPLAY METHOD, AND NON- TRANSITORY STORAGE MEDIUM STORING DISPLAY PROGRAM

CROSS-REFERENCE TO RELATED APPLICATIONS

This application is based upon and claims the benefit of priority from the prior Japanese Patent Application No. 2015-014146, filed Jan. 28, 2015, the entire contents of which are incorporated herein by reference.

BACKGROUND OF THE INVENTION

1. Field of the Invention

The present invention relates to a display apparatus, a display method, and a non-transitory storage medium storing a display program.

2. Description of the Related Art

In recent years, a suggestion concerning a system that requests someone to take a picture which cannot be taken by a user himself has been made. For example, according to a system of Jpn. Pat. Appln. KOKAI Publication No. 2011-211388, a photography request including return conditions is transmitted from a terminal of a photography requester to a terminal of a camera user who is a request accepter, and the camera user is charged with a point in exchange for a photographed image when the camera user has taken a photograph.

BRIEF SUMMARY OF THE INVENTION

According to a first aspect of the invention, there is provided a display apparatus comprising: a request information acquiring section which acquires request information including information to distinguish a target; an information analyzing section which analyzes the request information acquired by the request information acquiring section, and extracts information required to distinguish the target; and a distinction tip deciding section which decides a distinction tip when a user distinguishes the target based on the information extracted by the information analyzing section.

According to a second aspect of the invention, there is provided a display method comprising: acquiring request information including information to distinguish a target; analyzing the acquired request information and extracting information required to distinguish the target; and deciding a distinction tip when a user distinguishes the target based on the extracted information.

According to a third aspect of the invention, there is provided a computer-readable non-transitory storage medium storing a display program, the display program comprising: acquiring request information including information to distinguish a target; analyzing the acquired request information and extracting information required to distinguish the target; and deciding a distinction tip when a user distinguishes the target based on the extracted information.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodi-

DETAILED DESCRIPTION OF THE INVENTION

Figures 1, 2:
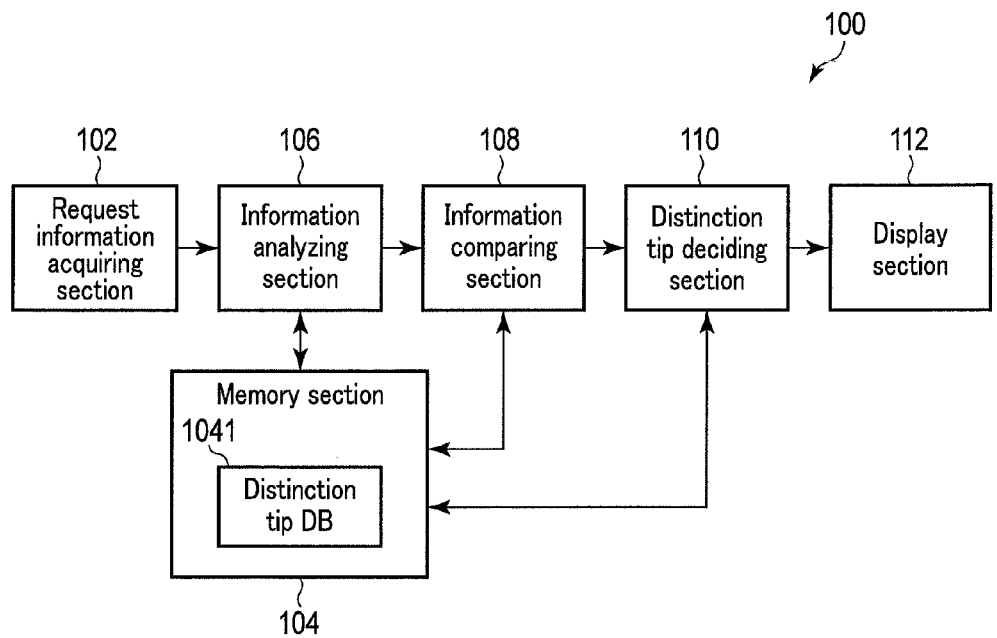

Hereinafter, an embodiment according to the present invention will be described with reference to the drawings. FIG. 1 is a block diagram showing a conceptual configuration of an imaging apparatus which is an example of a display apparatus according to an embodiment of the present invention. An imaging apparatus 100 includes a request information acquiring section 102, a memory section 104, an information analyzing section 106, an information comparing section 108, a distinction tip deciding section 110, and a display section 112. Of these members, the request information acquiring section 102, the information analyzing section 106, the information comparing section 108, and the distinction tip deciding section 110 are constituted of, e.g., ASICs including a CPU and a memory. It is to be noted that, as the imaging apparatus 100, various kinds of mobile information devices such as a digital camera having a communicating function or a smartphone can be applied.

The request information acquiring section 102 acquires photography request information from an external information device. The photography request information is information indicative of a request for photography, and includes information of a photography requester and information of a subject as a photography target. The information of a subject as a photography target is information including characteristics of the photography target required to, e.g., visually distinguish the photography target by a photographer as a user, and includes, e.g., an image of the subject as a photography target (which will be referred to as a requested image hereinafter). Besides, the information of the subject as a photography target includes not only graphic information such as a color, a shape, or a design or a pattern including such items but also comparative information indicative of a difference from other objects such as information of a height of the subject as a photography target. Furthermore, the information of a photography requester is, e.g., a name of the photography requester.

The memory section 104 is, e.g., a flash memory or a hard disk, and stores a distinction tip database (DB) 1041. The distinction tip DB 1041 is a database storing distinction tips of the subject as a photography target and information required to adopt the distinction tips. The distinction tip in this specification is a distinction tip for the photographer to, e.g., visually distinguish a subject requested to be photographed from the photography requester.

FIG. 2 shows an example of the distinction tip DB 1041. It is to be noted that FIG. 2 shows the distinction tips chiefly when the subject is a person. In the example of FIG. 2, as distinction tip items in case of a person, hair, clothes (upper and lower), shoes, a gender, a height, a school year/class, and the like are provided. As to each distinction tip, the subject is distinguished by using different pieces of information. It is to be noted that, as information that can be represented by a numerical value like a height, an absolute value may be used, or a relative value to a given reference value may be used.

FIG. 2 shows an example of the distinction tips of a person. It is to be noted that distinction tips for a subject other than the person may be present. In this case, items in the distinction tip DB 1041 are different from those of the person. For example, in case of an animal, a color of body hair, a shape of an ear, a shape of a tail, and others can be registered as distinction tips.

The information analyzing section 106 analyzes the photography request information acquired by the request information acquiring section 102, and extracts information required to distinguish a subject by using each distinction tip in the distinction tip DB 1041. The information analyzing section 106 detects, e.g., an image of a hair region of the subject from a requested image or detects an image of a clothes region of the subject. As regards information that is easier to be read from an image than to be measured by a human, information that is hard to be memorized by a human, or information that is easier to be specifically represented in the form of an image than words uttered by a human, analysis of an imaging result is effective, and the effects of this embodiment become prominent. The analysis of an imaging result enables detecting small differences and emphatically representing them.

When the information analyzing section 106 has successfully extracted the same type of information from multiple pieces of photography request information, the information comparing section 108 compares the extracted pieces of information with each other. For example, when images of hair regions have been extracted from images, the information comparing section 108 extracts differences between the images of the hair regions.

The distinction tip deciding section 110 decides a distinction tip of a subject based on the information extracted by the information analyzing section 106 and a result of comparison made by the information comparing section 108. This can be realized with a simple configuration by using a technology of finding differences in regions of objects in a comparison of images of the requested objects. Moreover, similar sample images and the like other than the requested objects may be used. Additionally, these sample images and the like may be acquired by photography performed by a person who accepted a request, or may be acquired from a database. If the number of pieces of image information in a group increases, a region that is considerably different from average images can be found from regions of an object. Consequently, it is possible to make a determination on plainer difference items and perform highlighting. Further, the distinction tip deciding section 110 displays information indicative of a decided distinction tip in the display section 112 so that it can be visually confirmed by a photographer who was asked for photography. This display is, e.g., icon display. The display may be effected to emphasize a difference. For example, in case of similar polka-dot patterns, a comparison of imaging results can more accurately determine a difference between sizes than a human eye can. In particular, in case of images provided at different timings, a difference determined from a comparison of imaging results is more accurate than a difference determined by a visual confirmation of a human eye.

Figure 3:
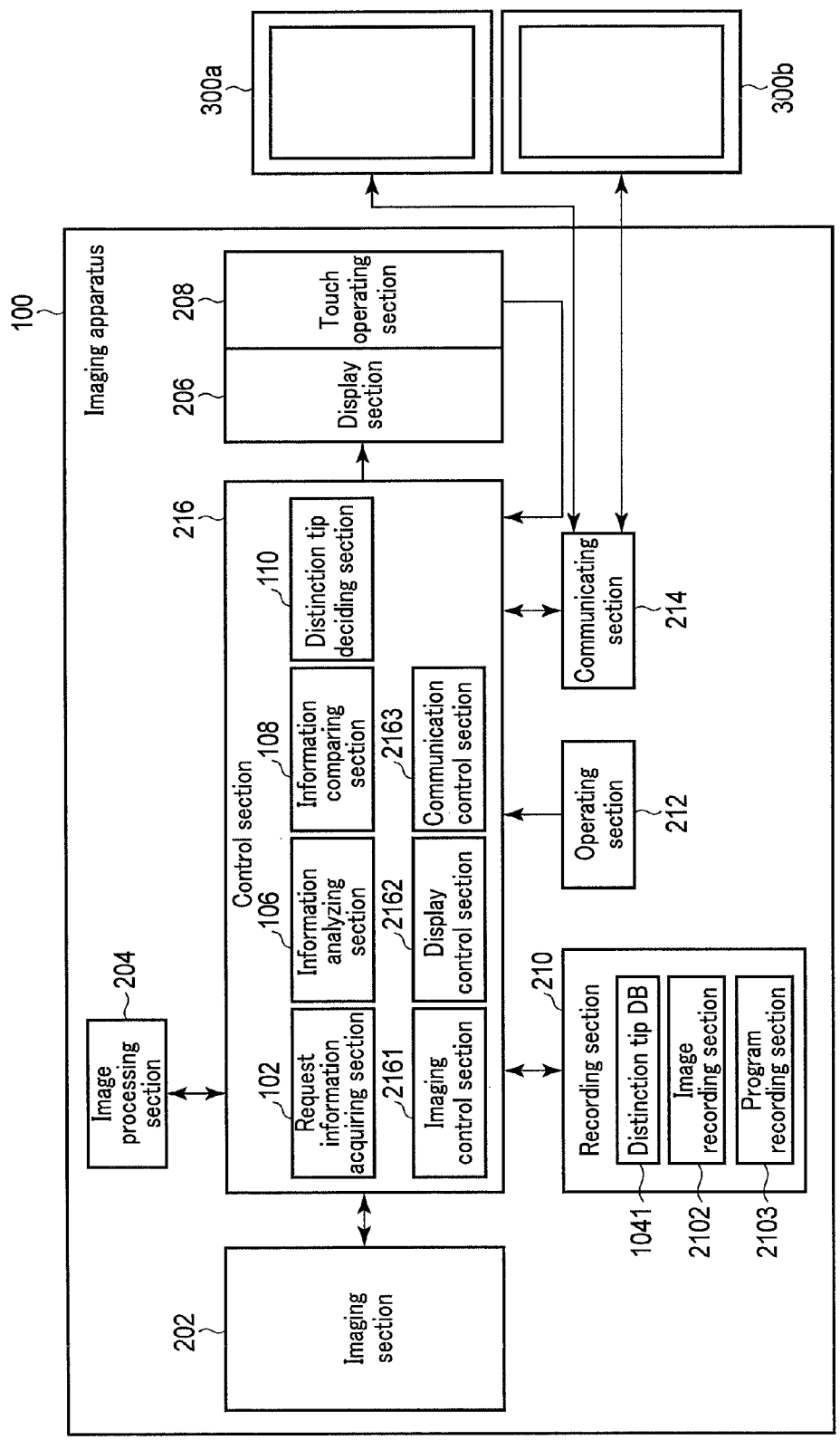

FIG. 3 is a block diagram showing a detailed configuration of the imaging apparatus 100 in FIG. 1. The imaging apparatus 100 shown in FIG. 3 includes an imaging section 202, an image processing section 204, a display section 206, a touch operating section 208, a recording section 210, an operating section 212, a communicating section 214, and a control section 216.

The imaging section 202 includes a photographing optical system, a diaphragm, an imaging element, and an imaging signal processing circuit, images a subject, and generates image data concerning the subject. The photographing optical system condenses a luminous flux from a non-illustrated subject. The diaphragm adjusts an amount of the luminous flux that enters a light receiving surface of the imaging element. The imaging element includes the light receiving surface on which an image of the luminous flux condensed by the photographing optical system is formed. On the light receiving surface, pixels of a photodiode or the like are two-dimensionally arranged. Furthermore, on a light incidence side of the light receiving surface, a color filter is provided. The above-descried imaging element converts an image corresponding to the luminous flux image-formed on the light receiving surface (a subject image) into an electrical signal corresponding to a light quantity of this image (which will be referred to as an imaging signal hereinafter). The imaging signal processing circuit executes analog processing such as automatic gain control (AGC) processing to the imaging signal provided by the imaging element. Additionally, the imaging signal processing circuit converts the analog-processed imaging signal into a digital signal (which will be referred to as image data hereinafter).

The image processing section 204 executes various kinds of image processing to the image data provided by the imaging section 202. The image processing includes white balance correction processing, color correction processing, a gamma (γ) correction processing, enlargement/reduction processing, compression processing, and others. Further, the image processing section 204 also executes expansion processing to compressed image data.

The display section 206 is, e.g., a liquid crystal display (LCD), and displays various kinds of images such as an image for live view (a live view image) and an image recorded in the recording section 210. The touch operating section 208 is integrally formed on a display screen of the display section 206, and detects, e.g., a touch position of a finger or the like of a photographer on the display screen.

The recording section 210 is, e.g., a built-in flash memory in the imaging apparatus 100. This recording section 210 corresponds to the memory section 104, and includes a distinction tip DB 2102 corresponding to the distinction tip DB 1041. Furthermore, the recording section 210 includes an image recording section 2102 and a program recording section 2103. In the image recording section 2102, an image file generated by a photographing operation is recorded. In the program recording section 2103, a program or setting data used by the control section 216 is recorded.

The operating section 212 includes various kinds of operation members through which the imaging apparatus 100 accepts instructions from a photographer. The operation members include a power supply switch, a release button, and others. The power supply button is a switch through which the photographer instructs to turn on or off a power supply of the imaging apparatus 100. The release button is a button through which the photographer instructs to execute photography.

The communicating section 214 includes various kinds of interfaces for wireless communication such as an interface of wireless LAN communication. This communicating section 214 executes communication with various kinds of information devices 300a and 300b. Here, as the information devices 300a and 300b, there are, e.g., smartphones. However, the information devices 300a and 300b do not have to be the smartphones as long as they have a communicating function to transmit photography request information to the imaging apparatus 100.

The control section 216 comprises, e.g., ASICs including a CPU and a memory, and controls operations of respective blocks in the imaging apparatus 100 in accordance with a program recorded in the program recording section 2103 in the recording section 210.

The control section 216 has a function of the request information acquiring section 102, a function of the information analyzing section 106, a function of the information comparing section 108, and a function of the distinction tip deciding section 110. These respective functions are the same as those described in conjunction with FIG. 1.

Additionally, the control section 216 has a function of an imaging control section 2161, a function of a display control section 2162, and a function of a communication control section 2163. The function of the imaging control section 2161 is a function of controlling an imaging operation executed by the imaging section 202. The function of the display control section 2162 is a function of controlling display of various kinds of images in the display section 206. The function of the communication control section 2163 is a function of performing control at the time of communicating with the information devices 300a and 300b through the communicating section 214.

Here, the respective functions of the control section 216 may be realized by hardware different from the control section 216.

Figure 4A:
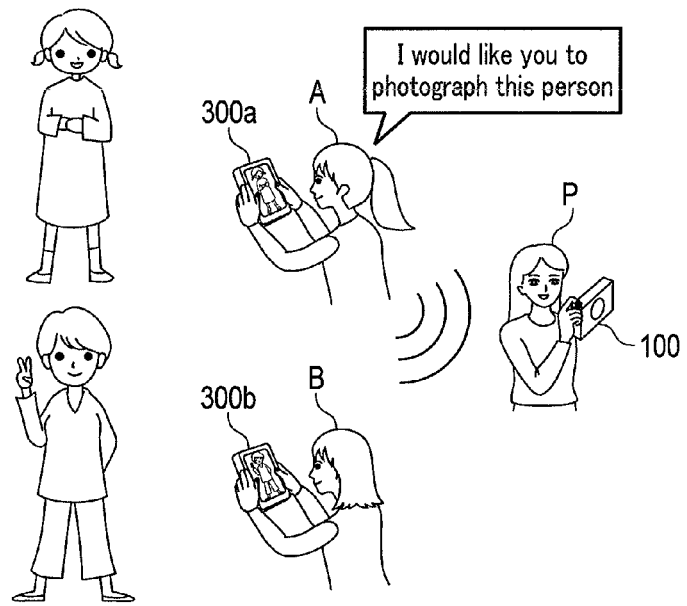
Figure 4B:
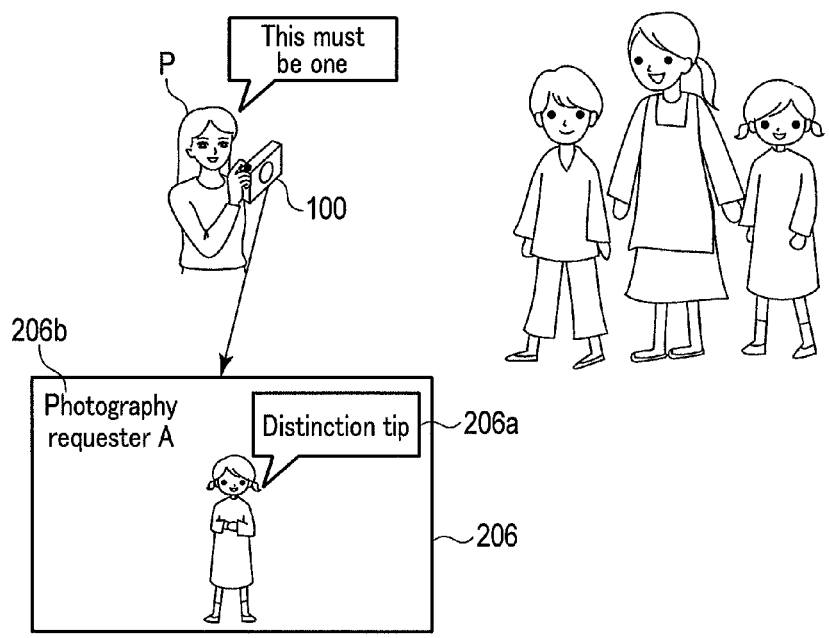

An outline of an operation of the imaging apparatus according to this embodiment will now be described hereinafter. FIG. 4A and FIG. 4B are views for explaining an outline of an operation of the imaging apparatus according to this embodiment.

In this embodiment, a photography requester A who owns the information device 300a or a photography requester B who owns the information device 300b requests for photography. At the time of requesting for the photography, as shown in FIG. 4A, the photography requester A transmits photography request information from the information device 300a to the imaging apparatus 100 owned by a photographer P. Furthermore, as shown in FIG. 4B, the photography requester B transmits photography request information from the information device 300b to the imaging apparatus 100 owned by the photographer P. As described above, the photography request information is information indicative of a request for photography, and includes, e.g., a requested image. The requested image can be provided by photographing, e.g., a photography target in advance. It is to be noted that FIG. 4A shows an example where the pieces of photography request information from the two information devices are accepted by the imaging apparatus 100. However, the imaging apparatus 100 may be configured to accept the photography request information transmitted from one information device, or may be configured to accept the pieces of photography request information transmitted from three or more information devices. It is needless to say that comparing images can make distinction tips clear in a group while shedding light on a difference between requested objects. That is, the imaging apparatus including the request information acquiring section that acquires pieces of photography request information including information to distinguish a subject as a photography target, the information analyzing section that analyzes the pieces of photography request information acquired by the request information acquiring section, compares images in accordance with each region of each image, and extracts information required to distinguish the subject as the photography target, and the distinction tip deciding section, which decides a distinction tip at the time of distinguishing the subject as the photography target by a photographer based on the information extracted by the information analyzing section, can find a requested object with an objective mark. According to such an imaging apparatus, image characteristics of images are compared to determine different points including points to notice such as a difference between confusingly similar names written on name tags or a difference between numbers on cloth bibs, thereby urging a user to perform photography. Moreover, when the number of requested targets or pieces of image information in a group increases, a region that is considerably different from an average image can be found from regions of the object, a determination can be made on plainer different item, and highlighting can be performed.

In the imaging apparatus 100 that has received the photography request information, a distinction tip of a photography target is decided from the received photography request information. When the distinction tip is decided, as shown in FIG. 4B, a distinction tip icon 206a as an example of information showing a distinction tip to the photographer and information 206b of the photography requester as well as the requested image are displayed in the display section 206 of the imaging apparatus 100. For example, the example of FIG. 4B is a display example where distinguishing a subject that has been requested to be photographed from the photography requester A based on "shoes" is decided. In this case, the distinction tip icon 206a is display to show a position of the shoes of the subject. Here, in the example of FIG. 4B, as the distinction tip icon 206a, an icon including text information "distinction tip" is displayed. On the other hand, it is also possible to display text information directly showing a region to be distinguished, e.g., a "hair style" or "shoes".

With the distinction tip icon 206a displayed as shown in FIG. 4B, the photographer can find the subject as the photography target while visually confirming shoes of a person. In a comparison of images acquired at different times, this method facilitates the distinction tip. When a distinction tip is highlighted, a region that is often accidentally overlooked can be securely found. As emphasizing methods, an emphasis using words may be performed, an arrow may be displayed, and a change in various kinds of image representation such as a change in color or enlargement may be made. Sounds and the like may be combined.

Figure 5:
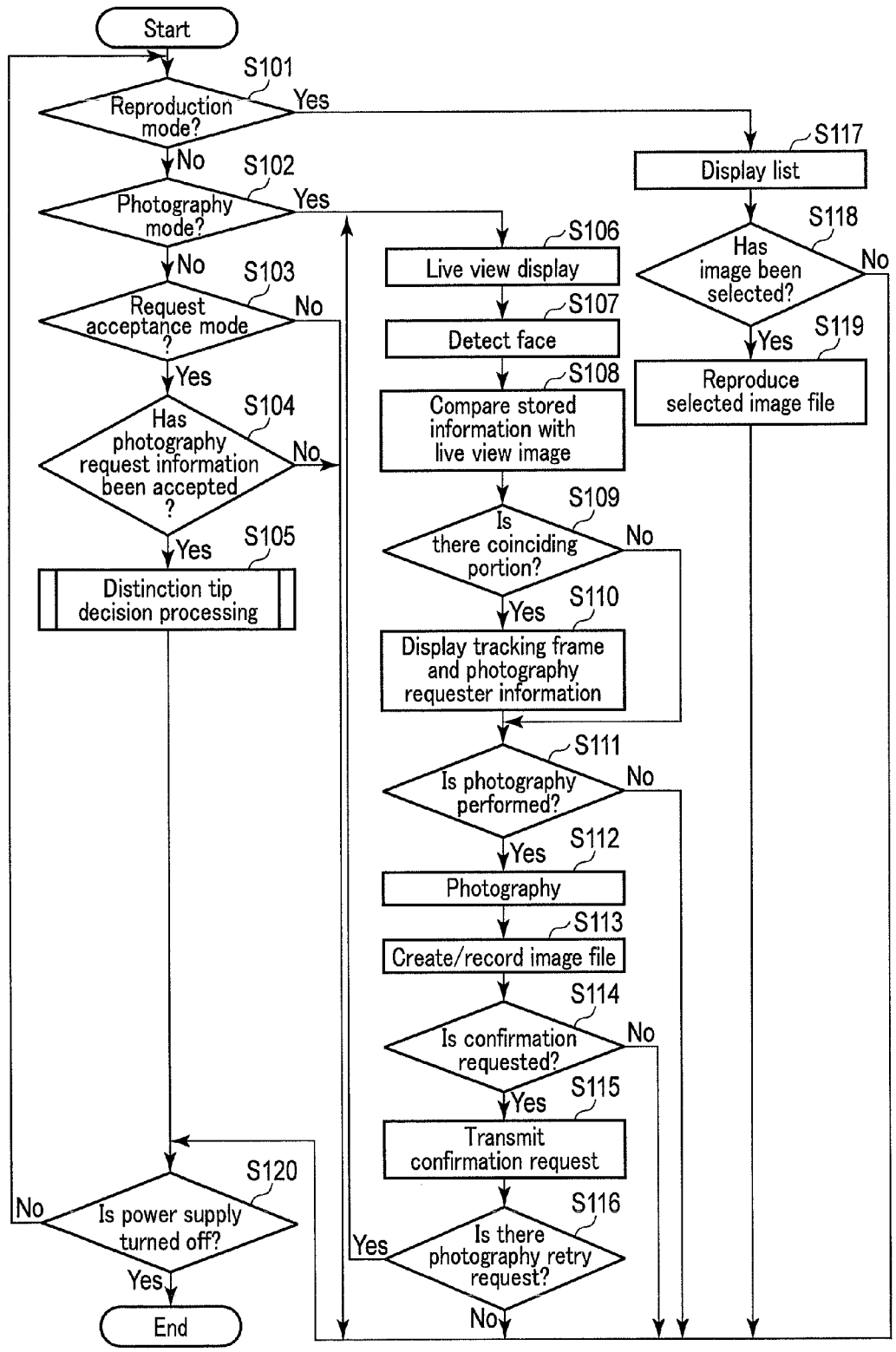

FIG. 5 is a flowchart showing main processing of the imaging apparatus. The processing of FIG. 5 is controlled by the control section 216.

At step S101, the control section 216 determines whether an operation mode of the imaging apparatus 100 is a reproduction mode. The imaging apparatus 100 has the production mode, a photography mode, and a request acceptance mode as operation modes. The reproduction mode is the operation mode to reproduce an image file recorded in the recording section 210. The photography mode is an operation mode to obtain an image file for recording. The request acceptance mode is an operation mode to accept a photography request from the photography requester. It is to be noted that the operation modes are set by, an operation of the operating section 212 effected by the photographer. When the operation mode is the reproduction mode at the step S101, the processing advances to step S117. When the operation mode is not the reproduction mode at the step S101, the processing advances to step S102.

At the step S102, the control section 216 determines whether the operation mode of the imaging apparatus 100 is the photography mode. When the operation mode is the photography mode at the step S102, the processing advances to step S106. When the operation mode is not the photography mode at the step S102, the processing advances to step S103.

At the step S103, the control section 106 determines whether the operation mode of the imaging apparatus 100 is the request acceptance mode. It is to be noted that whether the operation mode is the request acceptance mode may be determined by not only an operation state of the operating section 212 but also determining whether the photography request information has been accepted from the information device. When the operation mode is the request acceptance mode at the step S103, the processing advances to step S104. When the operation mode is not the request acceptance mode at the step S103, the processing advances to step S120.

At the step S104, the control section 216 determines whether the photography request information has been accepted from the information device through the communicating section 214. When the photography request information has been accepted at the step S104, the processing advances to step S105. When the photography request information has not been accepted at the step S104, the processing advances to step S120.

Figure 6:
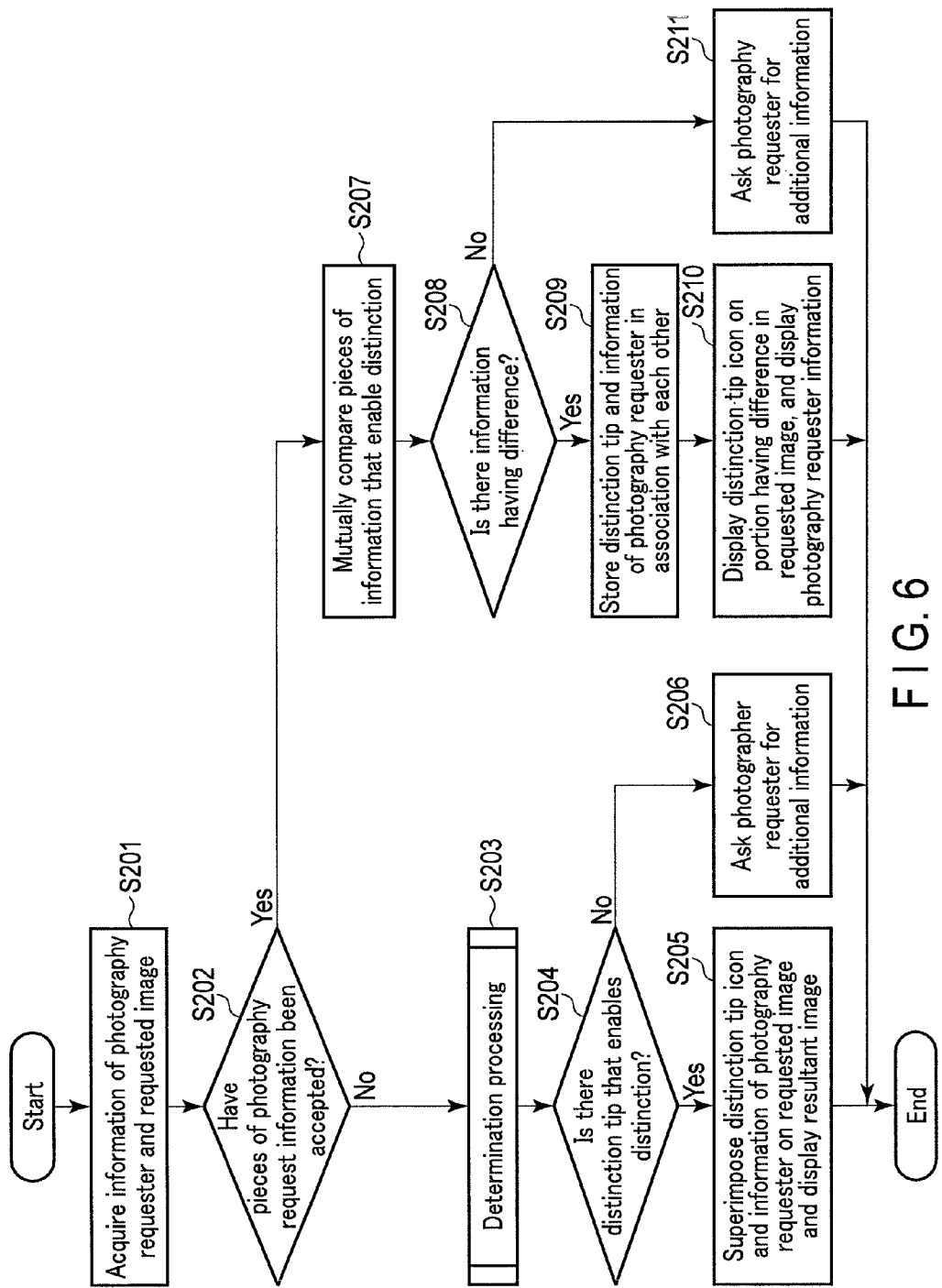

At the step S105, the control section 216 executes distinction tip decision processing. After the distinction tip decision processing, the processing advances to the step S120. The distinction tip decision processing is processing of deciding a distinction tip from an image of a subject as a photography target included in the photography request information. The distinction tip decision processing will now be described hereinafter. FIG. 6 is a flowchart showing the distinction tip decision processing.

At step S201, the control section 216 acquires information of the photography requester and a requested image from the photography request information, and stores the acquired information of the photography requester and the requested image, respectively.

At step S202, the control section 216 determines whether multiple pieces of photography request information have been accepted. When the multiple pieces of photography request information have not been accepted at the step S202, the processing advances to step S203. When the multiple pieces of photography request information have been accepted at the step S202, the processing advances to step S207.

Figure 7B:
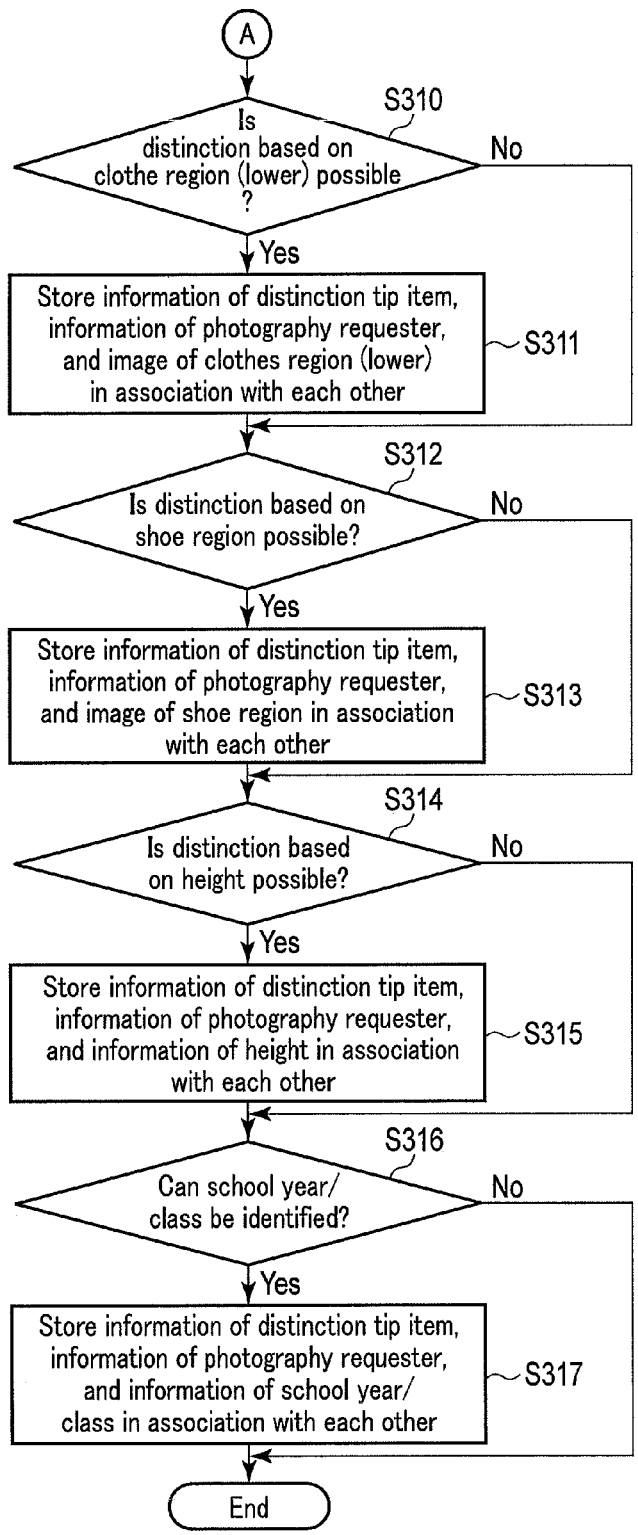

At the step S203, the control section 216 executes determination processing to determine whether a subject can be distinguished by each distinction tip registered in the distinction tip DB 1401. The determination processing will now be described hereinafter. FIG. 7A and FIG. 7B are flowcharts showing the determination processing.

At step S301, the control section 216 detects a facial region of a subject in a requested image. The facial region is determined by, e.g., a distribution of a shade pattern in image data. That is, if a characteristic shade pattern is detected in the facial region, a face can be detected in a region including this shade pattern.

At step S302, the control section 216 stores information indicating that distinction based on a gender is possible in association with information of a gender determined from the facial region and the information of the photography requester.

At step S303, the control section 216 detects a hair region of the subject in the requested image based on a position of the facial region. The hair region is detected by detecting a region that is above the facial region and has a color different from the facial region.

Figure 8:
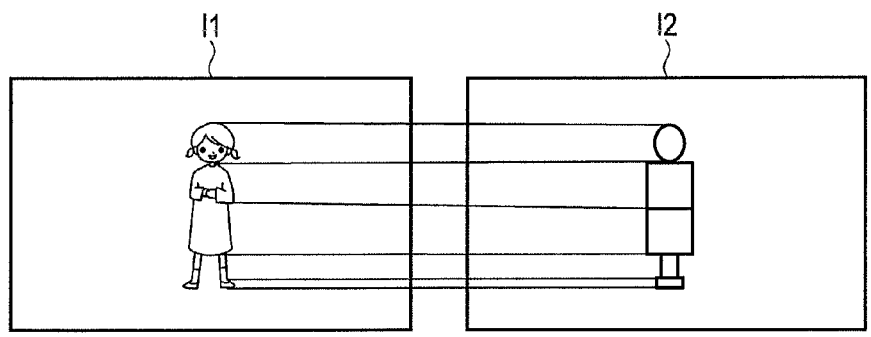

At step S304, the control section 216 detects a clothes region (upper), a clothes region (lower), and a shoe region of the subject in the requested image based on the position of the facial region, respectively. Assuming that the position and a size of the facial region are clear and the subject is standing upright, a physique of the subject can be estimated from the position and the size of the facial region. This estimation is carried out by, e.g., comparing a requested image I1 with a six-head figure model image I2 as shown in FIG. 8. Here, the six-head figure model image I2 is an image of a modeled person with a six-head figure consisting of a facial region, a body region (upper), a body region (lower), a leg region, and a shoe region. If a size of the facial region of the requested image I1 is substantially equal to a size of the facial region of the six-head figure model image I2, positions of the clothes region (upper), the clothes region (lower), and the shoes of the subject in the requested image I1 correspond to positions of the body region (upper) and the body region (lower) of the six-head figure model image I2 on one-on-one level. On the other hand, if the size of the facial region of the requested image I1 is not equal to the size of the facial region of the six-head figure model image I2, the positions of the clothes region (upper), the clothes region (lower), and the shoe region of the subject in the requested image I1 can be estimated by enlarging or reducing the six-head figure model image I2 in accordance with a difference in size between the facial images. In this manner, the clothes region (upper), the clothes region (lower), and the shoe region of the subject in the requested image I1 can be detected.

At step S305, the control section 216 estimates a height of the subject in the requested image. If another subject whose length is known shows up in the requested image, the height of the subject in the requested image can be estimated based on this length. Further, optical information such as a subject distance or a focal distance of the photographing optical system at the time of acquiring the requested image is already known, the height of the subject in the requested image can be estimated from such information.

At step S306, the control section 216 determines whether distinction based on a hair style is possible. This determination is made by, e.g., comparing an image of the hair region detected at the step S303 with an image of a reference hair region. For example, an image of a hair region of short hair can be compared as the image of the reference hair region. At this time, when a length of hair of the subject in the requested image is sufficiently longer or shorter than a length of the reference hair or when a color of hair is sufficiently different from a color of the reference hair, it is determined that the hair style of the subject is characteristic and the distinction based on the hair style is possible. When the distinction based on the hair style is possible at the step S306, the processing advances to step S307. When the distinction based on the hair style is not possible (including a case where the hair region is not detected) at the step S306, the processing advances to step S308. It is to be noted that, in the determination at the step S306, the image of the hair region of the subject in the requested image may be compared with an image of the reference hair region in each category, e.g., a male adult, a female adult, a boy, or a girl.

At the step S307, the control section 216 stores the information indicating that the distinction based on the hair style is possible and the image of the hair region in the requested image in association with the information of the photography request. Then, the processing advances to step S308.

At the step S308, the control section 216 determines whether the distinction based on the clothes (upper) is possible. This determination is made by, e.g., comparing an image of the clothes region (upper) detected at the step S304 with an image of a reference clothes region (upper). For example, when a pattern or a color is sufficiently different from the reference, it is determined that the clothes of the subject are characteristic and the distinction based on the clothes is possible. When the distinction based on the clothes region (upper) is possible at the step S308, the processing advances to step S309. When the distinction based on the clothe region (upper) is not possible (including a case where the clothes region (upper) is not detected) at the step S308, the processing advances to step S310.

At the step S309, the control section 216 stores information indicating that the distinction based on the clothes is possible and the image of the clothes region (upper) in the requested image in association with the information of the photography requester. Then, the processing advances to the step S310.

At the step S310, the control section 216 determines whether the distinction based on the clothes region (lower) is possible. This determination is made by, e.g., comparing the image of the clothes region (lower) detected at the step S304 with an image of a reference clothes region (lower). When the distinction based on the clothes region (lower) is possible at the step S310, the processing advances to step S311. When the distinction based on the clothes region (lower) is not possible (including a case where the clothes section (lower) is not detected) at the step S310 the processing advances to step S312.

At the step S311, the control section 216 stores information indicating that the distinction based on the clothes is possible and the image of the clothes region (lower) in the requested image in association with the information of the photography requester.

At the step S312, the control section 216 determines whether the distinction based on the shoe region is possible. This determination is made by, e.g., comparing the image of the shoe region detected at the step S304 with an image of a reference shoe region. When the distinction based on the shoe region is possible at the step S312, the processing advances to step S313. When the distinction based on the shoe region is not possible (including a case where the shoe region is not detected) at the step S312, the processing advances to step S314.

At the step S313, the control section 216 stores information indicating that the distinction based on the shoes and the image of the shoe region in the requested image in association with the information of the photography requester. Then, the processing advances to step S314.

At the step S314, the control section 216 determines whether the distinction based on a height is possible. This determination is made by, e.g., comparing the value of the height estimated at the step S305 with a value of a reference height. Furthermore, when the height of the subject in the requested image is sufficiently higher or lower than the reference height, it is determined that the height of the subject is characteristic and the distinction based on the height is possible. When the distinction based on the height is possible at the step S314, the processing advances to step S315. When the distinction based on the height is not possible at the step S314 (including a case where information of the height is not provided) at the step S314, the processing advances to step S316.

At the step S315, the control section 216 stores information indicating that the distinction based on the height is possible and the information of the height of the subject in the requested image in association with the information of the photography requester. Then, the processing advances to step S316.

At the step S316, the control section 216 determines whether a school year/class of the subject in the requested image can be identified. The determination of the step S316 is made by, e.g., determining whether the school year/class can be detected from text information, e.g., a name tag. When the school year/class of the subject in the requested image has been identified at the step S316, the processing advances to step S317. When the school year/class of the subject in the requested image has not been identified at the step S316, the processing of FIG. 7A and FIG. 7B is terminated.

At the step S317, the control section 216 stores information indicating that the distinction based on the school year/class is possible and information of the school year/class of the subject in the requested image in association with the information of the photography requester. Then, the processing of FIG. 7A and FIG. 7B is terminated. As described above, previously determining items that can be easily distinguished by a person is important, and wrinkles of clothes or dishevelment of hair which cannot be distinguished by a human eye can be emphasized by image comparison if the above-described ingenuity is not exercised. Although the distinction tips of a person are mainly described here, if discovery of an object that can appear in a pictorial book is urged, a specialized observation point is important. Thus, the photography requester or the like may be able to specify distinction items in advance. That is, a branch condition of the step S306 or the like may be configured to be changed. Further, if a comparison between images is possible in accordance with each region, the images may be compared with each other in accordance with each region, a list of distinction items may be displayed, and the distinction items may be manually discriminated.

A description will now return to FIG. 6. At step S204, the control section 216 determines whether a distinction tip is able to distinguish the subject in the determination processing is present. When the distinction tip is present at the step S204, the processing advances to step S205. When the distinction tip is not present at the step S204, the processing advances to step S206.

At the step S205, for example, as shown in FIG. 4B, the control section 216 combines the distinction tip icon 206a and the information 206b of the photographer requester with the requested image and displays a resultant image in the display section 206. Then, the processing of FIG. 6 is terminated.

At the step S206, since the subject as the photography target cannot be distinguished by using the current photography request information, the control section 216 transmits a request for additional information to distinguish the subject as the photography target to the information device that has transmitted the photography request information. Subsequently, the processing of FIG. 6 is terminated. Upon receiving this request, the photography requester transmits additional photography request information. For example, the photography requester transmits information of a height of the subject that is the photography target as the additional photography request information. Furthermore, in case of an event such as an athletic meeting, the photography requester transmits information such as information of a game the subject as the photography target participates in or information of an entrance gate as the additional photography request information. Such additional photography request information enables improving accuracy for distinguishing the subject as the photography target. It is to be noted that the additional photography request information may be transmitted in the form of responding to questionnaires from the photography by the photography requester. In this case, for example, an e-mail created by the photographer is transmitted to the information device of the photography requester as a request for additional information. The photographer makes an additional photography request by responding to this e-mail.

At step S207, the control section 216 mutually compares pieces of information, which are obtained from the photography request information and determined to enable distinction, in accordance with each distinction tip item registered in the distinction tip DB 1041. For example, it compares an image of a hair region extracted from a requested image of a photography requester A with an image of a hair region extracted from a requested image of a photography requester B.

At step S208, the control section 216 determines whether any one of the compared pieces of information has a difference. For example, if images of hair regions are compared with each other, the control section 216 determines whether a sum total of differences between corresponding pixel data is equal to or more a predetermined value. When any one of the pieces of information have a difference at the step S208, the processing advances to step S209. When any one of the pieces of information do not to have a difference at the step S208, the processing advances to step S211.

At the step S209, the control section 216 stores information indicative of the distinction tip item determined to have a difference in information in accordance with the information of each photography requester.

Figure 9:
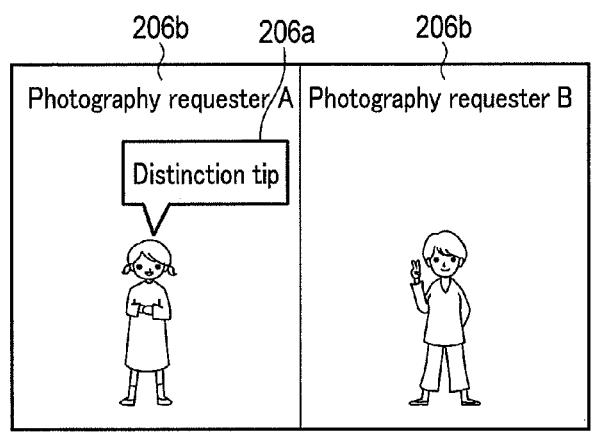

At step S210, for example, as shown in FIG. 9, the control section 216 combines the distinction tip icon 206a and the information 206b of the photography requester to the requested image, and displays a resultant image in the display section 206. Then, the processing of FIG. 6 is terminated. In the example of FIG. 9, the requested images are aligned and arranged. Moreover, the information 206b indicative of each photography requester who has transmitted the requested image is also displayed. When the photographer selects any one of the requested images, the distinction tip icon 206a is displayed in a portion of the selected requested image having a large difference in information from the other requested image. Consequently, the photographer can easily distinguish the subject as the photography target even though multiple photography requests are made.

At step S211, since the subject as the photography target cannot be distinguished from the current photography request information, the control section 216 transmits a request for additional information to distinguish the subject as the photography target to the information device that has transmitted the photography request information. Then, the processing of FIG. 6 is terminated. Upon receiving this request, the photography requester transmits additional photography request information. Consequently, an accuracy of distinguishing the subject as the photography target can be improved.

A description will now return to FIG. 5. At the step S106, the control section 216 performs live view display. In the live view display, the control section 216 continuously operates the imaging section 202 at a predetermined frame rate. Additionally, the control section 216 allows the display section 206 to perform the live view display based on image data for the live view display obtained by the image processing section 204.

At step S107, the control section 216 detects a facial region of the subject in each live view image sequentially obtained by the imaging section 202 with the live view display.

At step S108, the control section 216 compares the live view image with information stored by the distinction tip decision processing in the order of the distinction tip items registered in the distinction tip DB 1041. It is to be noted that, as a technique of detecting the clothes region (upper), the clothes region (lower), and the shoe region of the subject from each live view image, the same technique (e.g., a technique of the step S304) as the technique of detecting the clothes region (upper), the clothe region (lower), and the shoe region of the subject from the requested image can be applied.

At step S109, the control section 216 determines whether the live view image has a portion that coincides with the information stored by the distinction tip decision processing. When the coinciding portion is present at the step S109, the processing advances to step S110. When the coinciding portion is not present at the step S109, the processing advances to step S111.

At the step S110, as shown in FIG. 10, the control section 216 displays a tracking frame 206c on, e.g., a facial region of the subject, which has a portion coinciding with the information stored by the distinction tip decision processing, in the live view image. Further, the control section 216 also displays the information 206b of the photography requester.

At the step S111, the control section 216 determines whether a photography instruction has been issued by an operation of the operating section 212 of the photographer. When the photography instruction has been issued at the step S111, the processing advances to step S112. When the photography instruction has not been issued at the step S111, the processing advances to the step S120.

At the step S112, the control section 216 executes a photography operation. In the photography operation, the control section 216 allows the imaging section 202 to operate so that an exposure amount corresponding to brightness of the subject can be provided.

At step S113, the control section 216 generates an image file from image data provided by the image processing section 204. Furthermore, the control section 216 records the image file in the recording section 210.

At step S114, the control section 216 determines whether a confirmation of the subject as the photography target is to be requested. For example, when an instruction to request a confirmation of the subject as the photography target is issued by an operation of the touch operating section 208 or the operating section 212 of the photographer, it is determined that the confirmation of the subject as the photography target is to be requested. When the confirmation of the subject as the photography target is requested at the step S114, the processing advances to step S115. When the confirmation of the subject as the photography target is not requested at the step S114, the processing advances to the step S120.

At the step S115, the control section 216 transmits the request for the confirmation of the subject as the photography target to the information device that has requested for photography of this subject. The confirmation request includes image data obtained by a photography operation. The photography requester who has received such a confirmation request can confirm if a desired photograph has been taken. When the desired photograph has not been taken, the photography requester transmits a photography retry request. At this time, the photography requester may be able to transmit the photography retry request using a text such as "I would like you to zoom in this person", "a person in the photograph is wrong", or "I would like you to photograph this person". In this case, for example, an e-mail created by the photography requester is transmitted to the imaging apparatus of the photographer as the photography retry request.

At step S116, the control section 216 determines whether the photography retry request has been issued. When the photography retry request has been issued at the step S116, the processing returns to the step S106. In this case, the photographer again executes the photography in response to the photography retry request. When the photography retry request has not been issued at the step S116, the processing advances to the step S120.

At step S117, the control section 216 displays a list of image files recorded in the recording section 210 in the display section 206.

At step S118, the control section 216 determines whether an image file has been selected by an operation of the touch operating section 208 of the photographer. When the image file has been selected at the step S118, the processing advances to step S119. When the image file has not been selected at the step S118, the processing advances to the step S120.

At the step S119, the control section 216 reproduces the image file selected by the photographer. After end of reproduction of the image file, the processing advances to the step S120.

At the step S120, the control section 216 determines whether a power supply of the imaging apparatus is to be turned off. For example, when a power supply switch is operated by the photographer or when no operation is performed for a fixed period of time, the power supply is to be turned off. When the power supply of the imaging apparatus is not to be turned off at the step S120, the processing returns to the step S101. When the power supply of the imaging apparatus is to be turned off at the step S120, the processing of FIG. 5 is terminated.

As described above, according to this embodiment, the distinction tip to, e.g., visually distinguish the subject as the photography target is decided based on the photography request information received from the photography requester. Moreover, the decided distinction tip is presented to the photographer. The photographer can identify the subject as the photography target requested by the photography requester with the use of the presented distinction tip. When multiple photography requests are issued, a distinction tip with a large difference is presented. Thus, even if multiple photography requests are issued, the photographer can easily distinguish the subject as the photography target.

Additionally, in this embodiment, tracking of a subject during the photography mode is carried out by using information determined to enable distinction in the distinction tip decision processing. The information determined to enable distinction is characteristic information of the subject as a photography target. Thus, when tracking of the subject during the photography mode is performed by using the information determined to enable distinction in the distinction tip decision processing, an accuracy of tracking the subject can be improved.

Modifications of this embodiment will now be described hereinafter.

First Modification

In the foregoing embodiment, at the time of displaying the distinction tip icon 206a, the distinction tip icon 206 is combined with a requested image. On the other hand, the distinction tip icon 206a may be combined with such an avatar image 206d as shown in FIG. 11. As the avatar image 206d, for example, an image imitating a person like a six-head figure model shown in FIG. 8 can be applied.

Second Modification

The foregoing embodiment is an application example to the communication system having the imaging apparatus 100 and the information devices 300a and 300b. On the other hand, the technology of the foregoing embodiment can be also applied to a communication system including an imaging apparatus 100, information devices 300a and 300b, and a server 400 such as shown in FIG. 12. The imaging apparatus 100, the information devices 300a and 300b, and the server 400 are connected to each other through a network 500 to enable communication freely.

Such a communication system will now be described hereinafter. It is to be noted that the imaging apparatus 100 and the information devices 300a and 300b may be the same as those shown in FIG. 3. Thus, a description of these components will be omitted.

The server 400 includes a control section 402 and a recording section 404.

The control section 402 includes, e.g., a CPU and a memory, and controls an operation of the server 400 in accordance with a program recorded in a program recording section 4043 of the recording section 404.

The control section 402 has a function of a request information acquiring section 102, a function of an information analyzing section 106, a function of an information comparing section 108, and a function of a distinction tip deciding section 110. These respective functions are the same as those described in conjunction with FIG. 1.

Further, the control section 402 has a function of an access control section 4021. The function of the access control section 4021 is a function of determining contents of access from the imaging apparatus 100 or the information device 300a or 300b and executing processing corresponding to the determined contents.

The recording section 404 is, e.g., a hard disk. This recording section 404 includes a distinction tip DB 4041 corresponding to the distinction tip DB 1041. Furthermore, the recording section 404 includes an image recording section 4042 and the program recording section 4043. Image files transmitted from the imaging apparatus 100 are classified in accordance with each photography requester and recorded in the image recording section 4042. Information of each photographer is also recorded in each image file. Moreover, in the image recording section 4042, as photography request information from each photography requester transmitted from each of the information devices 300a and 300b, a requested image, information indicative of a distinction tip of a subject as a photography target (information of a distinction tip item), and information of the photography requester are recorded in accordance with each photographer. A program or setting data used by the control section 402 is recorded in the program recording section 4043.

Figure 13:
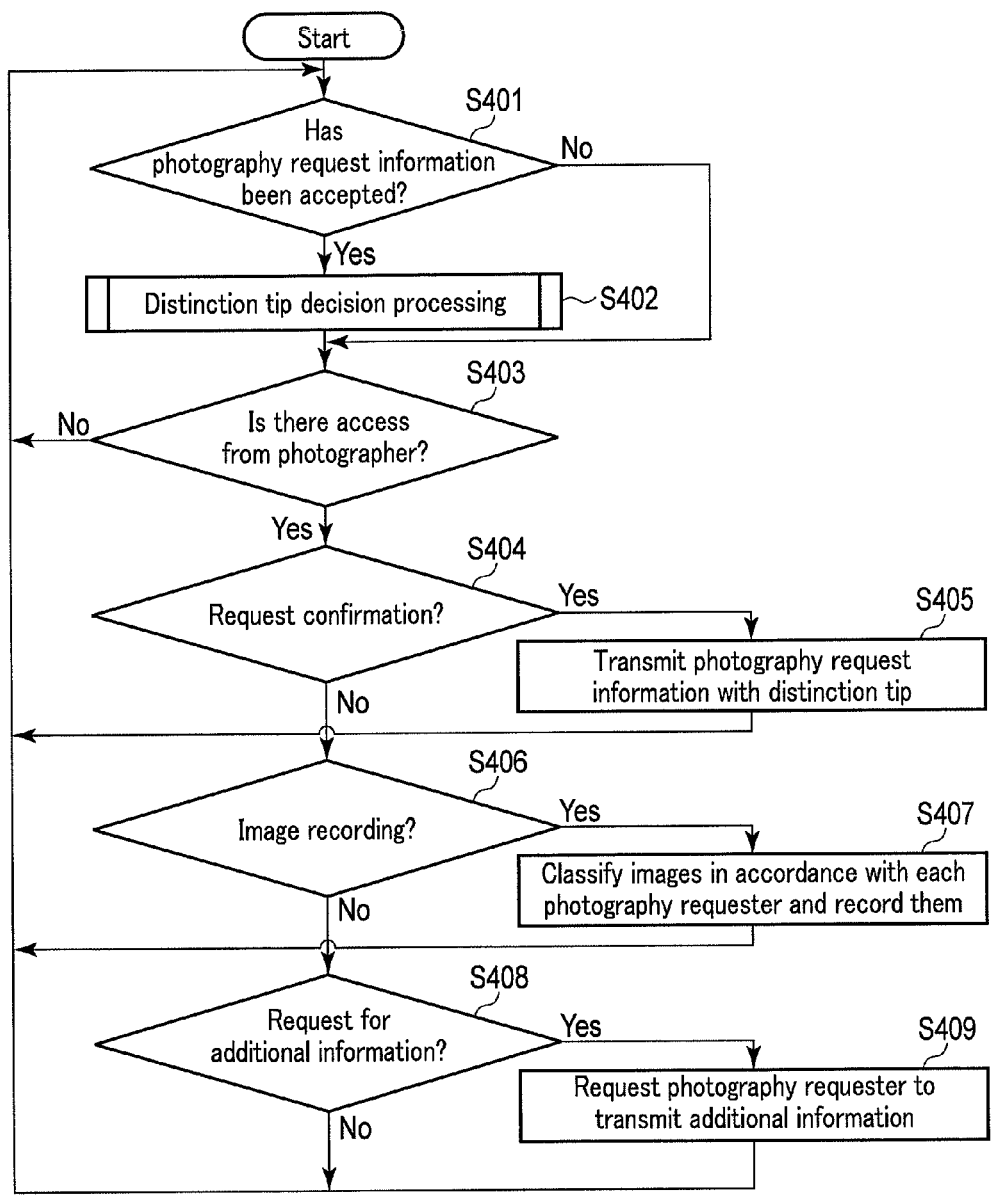

FIG. 13 is a flowchart showing processing of the server. The processing of FIG. 13 is controlled by the control section 402 in the server 400.

At step S401, the control section 402 determines whether the photography request information has been accepted from the information device 300a or 300b. When the photography request information has been accepted at the step S401, the processing advances to step S402. When the photography request information has not been accepted at the step S402, the processing advances to step S403.

At the step S402, the control section 402 executes distinction tip decision processing. The distinction tip decision processing is basically the same as that described in conjunction with FIG. 6, FIG. 7A, and FIG. 7B. However, as described above, the requested image, the information of the distinction tip of the subject as the photography target, and the information of the photography requester as the photography request information are recorded in the recording section 404 of the server 400. After the distinction tip decision processing, the processing advances to step S403.

At the step S403, the control section 402 determines whether access from the imaging apparatus 100, i.e., access from the photographer has been accepted. When the access from the photographer has not been accepted at the step S403, the processing returns to the step S401. When the access from the photographer has been accepted at the step S403, the processing advances to step S404.

At the step S404, the control section 402 determines whether a content of the access from the photographer is a request confirmation. When the content of the access from the photographer is the request confirmation at the step S404, the processing advances to step S405. When the content of the access from the photographer is not the request confirmation, the processing advances to step S406.

At the step S405, the control section 402 transmits the information of the distinction tip of the subject as the photography target and the information of the photography requester recorded in the recording section 404 as the photography request information from the photography requester to the imaging apparatus 100 owned by the photographer of the target. Then, the processing returns to the step S401.

At the step S406, the control section 402 determines whether the content of the access from the photographer is image recording. When the content of the access from the photographer is the image recording at the step S406, the processing advances to step S407. When the content of the access from the photographer is not the image recording at the step S406, the processing advances to step S408.

At the step S407, the control section 402 classifies photographed images transmitted from the photographer in accordance with each photography requester, and records them in the recording section 404. Then, the processing returns to the step S401.

At the step S408, the control section 402 determines whether the content of the access from the photographer is a request for additional information. When the content of the access from the photographer is the request for additional information at the step S408, the processing advances to step S409. When the content of the access from the photographer is not the request for additional information at the step S408, the processing returns to the step S401.

At the step S409, the control section 402 transmits a notification about the request for additional photography request information from the photographer to the information device as a target together with the information of the photographer. Then, the processing returns to the step S401.

Figure 14B:
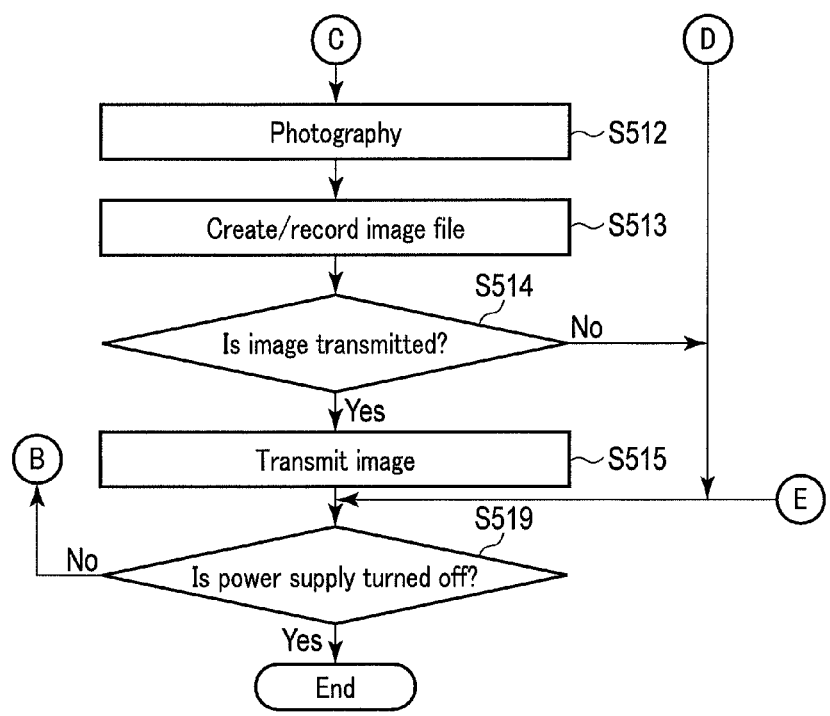

FIG. 14A and FIG. 14B are flowcharts showing processing of the imaging apparatus. The processing of FIG. 14A and FIG. 14B is controlled by the control section 216 of the imaging apparatus 100.

At step S501, the control section 216 determines whether an operation mode of the imaging apparatus 100 is a reproduction mode. In this modification, the imaging apparatus 100 has the reproduction mode and a photography mode as operation modes. When the operation mode is the reproduction mode at the step S501, the processing advances to step S516. When the operation mode is not the reproduction mode at the step S501, the processing advances to step S502.

At the step S502, the control section 216 determines whether the operation mode of the imaging apparatus 100 is the photography mode. When the operation mode is the photography mode at the step S502, the processing advances to step S503. When the operation mode is not the photography mode at the step S502, the processing advances to step S519.

At step S503, the control section 216 performs live view display. In the live view display, the control section 216 continuously operates the imaging section 202 at a predetermined frame rate. Further, the control section 216 allows the display section 206 to display a live view based on image data for live view display provided by the image processing section 204.

At step S504, the control section 216 determines whether an instruction of a request confirmation has been issued by an operation of the photographer through a touch operating section 208 or an operating section 212. When the instruction of the request confirmation has been issued at the step S504, the processing advances to step S505. When the instruction of the request confirmation has not been issued at the step S504, the processing advances to step S511.

At step S505, the control section 216 transmits a request for the request confirmation to the server 400. Subsequently, the control section 216 stands by until a requested image, information of a distinction tip of the subject as the photography target, and the information of the photography requester are transmitted as the photography request information from the server 400.

At step S506, the control section 216 combines a distinction tip icon 206*a* and the information 206*b* of the photography requester with the requested image and displays a resultant image in the display section 206 as shown in FIG. 4B or FIG. 9.

At step S507, the control section 216 detects a facial region of the subject in each live view image sequentially provided by the imaging section 202 in accordance with the live view display.

At step S508, the control section 216 compares the live view image with the requested image in accordance with each distinction tip item transmitted from the server 400.

At step S509, the control section 216 determines whether the live view image has a portion that coincides with the requested image. When the coinciding portion is present at the step S509, the processing advances to S510. When the coinciding portion is not present at the step S509, the processing advances to step S511.

At the step S510, the control section 216 displays a tracking frame 206*c* on, e.g., a facial region of the subject having a portion, which coincides with information stored by the distinction tip decision processing, in the live view image as shown in FIG. 10. Further, the control section 216 displays the information 206*b* of the photography requester.

At the step S511, the control section 216 determines whether a photography instruction has been issued by an operation of the photographer through the operating section 212. When the photography instruction has been issued at the step S511, the processing advances to step S512. When the photography instruction has not been issued at the step S511, the processing advances to step S519.

At the step S512, the control section 216 executes a photography operation. In the photography operation, the control section 216 operates the imaging section 202 so that an exposure amount corresponding to brightness of the subject can be provided.

At step S513, the control section 216 generates an image file from image data provided by the image processing section 204. Furthermore, the control section 216 records the image file in the recording section 210.

At step S514, the control section 216 determines whether an instruction to transmit a photographed image has been issued. For example, when the instruction to transmit the image has been issued by an operation of the photographer through the touch operating section 208 or the operating section 212, the instruction to transmit the image has been issued. When the instruction to transmit the image has been issued at the step S514, the processing advances to step S515. When the instruction to transmit the image has not been issued at the step S514, the processing advances to the step S519.

At the step S515, the control section 216 transmits the image provided by photography to the server 400 together with the information of the photographer and the photography requester. Then, the processing advances to the step S519.

At the step S515, the control section 216 allows the display section 206 to display a list of image files recorded in the recording section 210.

At step S517, the control section 216 determines whether an image file has been selected by an operation of the photographer through the touch operating section 208. When the image file has been selected at the step S517, the processing advances to step S518. When the image file has not been selected at the step S517, the processing advances to the step S519.

At the step S518, the control section 216 reproduces the image file selected by the photographer. After reproduction of the image file, the processing advances to the step S519.

At the step S519, the control section 216 determines whether a power supply of the imaging apparatus is turned off. For example, when a power supply switch is operated by the photographer or when no operation is performed for a fixed period of time, the power supply is determined to be turned off. When the power supply of the imaging apparatus is not to be turned off at the step S519, the processing returns to the step S501. When the power supply of the imaging apparatus is to be turned off at the step S519, the processing of FIG. 14A and FIG. 14B is terminated.

Even in Modification 2 described above, the photographer can identify a subject as a photography target requested by the photography requester by using a presented distinction tip.

Each processing according to the foregoing embodiment can be stored as a program that can be executed by a CPU or the like as a computer. Besides, it can be stored in a storage medium of an external memory device such as a memory card, a magnetic disk, an optical disk, or a semiconductor memory, and then distributed. Furthermore, the CPU or the like reads the program stored in the storage medium of this external memory device, and this read program controls an operation, thereby executing the processing. It is to be noted that the foregoing embodiment has been described while emphasizing photography of a subject, but the photography does not have to be performed in view of a superordinate concept which is enabling immediately finding an object. A use purpose of indicating a distinction tip to a third person for misleading images can be applied to an inspection apparatus or the like. The use purpose is not restricted to a consumer application, and it may be an industrial application or a medical application. In case of the medical application, the preset invention can be adopted in a use application of consulting about a need for a diagnosis by using an image. For example, there can be considered a use application that photographs or the like for a comparison between a healthy skin and a skin requiring a diagnosis are used through a DB on a network and a warning is given only when the diagnosis is required. A deformity of a region that is not instantaneously recognizable even to a person who is suffering from hallux valgus can be determined by comparing multiple images, thereby urging photography of diagnostic images. When the present invention is mounted in a vehicle, it can be used for navigation or the like to recognize a difference between similar buildings and guide to a correct building. It is possible to recognize, e.g., a difference in characters such as a confusing name of an intersection. As an idea that is seen as an extension of highlighting a distinction tip, an application of prompting photography after successful distinction or automatically performing photography can be considered, but such an invention is also covered by the present invention. When such an application is a use application of a robot or a monitoring camera, a basic specification can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising: an image request information acquiring circuit that receives a request for an image of a photographing target; an imager that acquires a live view image; an information analyzing circuit that analyzes the request and extracts image distinction information from the request, wherein the image distinction information includes information of characteristics of objects in an image for a photographer to visually distinguish the photographing target; a comparing circuit which mutually compares pieces of the live view image with the image distinction information to form pieces of image distinction information; a distinction tip deciding circuit that compares the live view image with the pieces of image distinction information, and decides a distinction tip when the live view image includes a portion that coincides with one or more of the pieces of image distinction information; and a display that displays information indicative of the distinction tip and information from the request as a combined image that is superimposed on the live view image to distinguish the photographing target, wherein the information indicative of the distinction tip indicates a position of the image distinction information as text information corresponding to the portion that coincides with one or more of the pieces of image distinction information.

2. The imaging apparatus according to claim 1, wherein the distinction tip deciding circuit compares the image distinction information extracted by the information analyzing circuit with a preset reference, and the distinction tip corresponds to image information of the live view image which is largely different from the preset reference.

3. The imaging apparatus according to claim 1, further comprising:
wherein the distinction tip corresponds to largely different information in the pieces of image distinction information to distinguish the photographing target.

4. The imaging apparatus according to claim 1, wherein, the distinction tip deciding circuit requests additional image request information, when the distinction tip is not decided based on the image distinction information extracted by the information analyzing circuit.

5. The imaging apparatus according to claim 1, wherein the combined image further displays an avatar image that is indicative of the distinction tip.

6. A display method for an imaging apparatus comprising: receiving a request for an image of a photographing target; imaging a subject to obtain a live view image; extracting image distinction information from the request, wherein the image distinction information includes information of characteristics of objects in an image for a photographer to visually distinguish the photographing target; mutually comparing pieces of the live view image with the image distinction information to form pieces of image distinction information; comparing the live view image with the pieces of image distinction information; deciding a distinction tip when the live view image includes a portion that coincides with one or more of the pieces of image distinction information; and displaying information indicative of the distinction tip and information from the request as a combined image that is superimposed on the live view image to distinguish the photographing target; wherein the information indicative of the distinction tip indicates a position of the image distinction information as text information corresponding to the portion that coincides with one or more of the pieces of image distinction information.

7. A computer-readable non-transitory storage medium storing a display program, the display program comprising: receiving a request for an image of a photographing target; imaging a subject to obtain a live view image; extracting image distinction information from the request, wherein the image distinction information includes information of characteristics of objects in an image for a photographer to visually distinguish the photographing target; mutually comparing pieces of the live view image with the image distinction information to form pieces of image distinction information; comparing the live view image with the pieces of image distinction information; deciding a distinction tip when the live view image includes a portion that coincides with one or more of the pieces of image distinction information; and displaying information indicative of the distinction tip and information from the request as a combined image that is superimposed on the live view image to distinguish the photographing target, wherein the information indicative of the distinction tip indicates a position of the image distinction information as text information corresponding to the portion that coincides with one or more of the pieces of image distinction information.

8. The imaging apparatus according to claim 1, wherein the live view image includes an image of a subject that is a person.

9. The imaging apparatus according to claim 1, wherein the distinction tip visually distinguishes a subject.

10. The imaging apparatus according to claim 9, wherein the distinction tip is at least one of hair color, facial features, gender, clothing, height, and shoes.

* * * * *